(12) United States Patent
Robert

(10) Patent No.: US 6,488,263 B2
(45) Date of Patent: Dec. 3, 2002

(54) VALVE STEM AND METHOD OF MANUFACTURE; IMPROVED STEM PACKING

(75) Inventor: Raoul W. Robert, Baton Rouge, LA (US)

(73) Assignee: T & R Solutions, Inc., Prairieville, LA (US)

( * ) Notice: Subject to any disclaimer, the term of this patent is extended or adjusted under 35 U.S.C. 154(b) by 0 days.

(21) Appl. No.: 09/839,831

(22) Filed: Apr. 19, 2001

(65) Prior Publication Data

US 2001/0013585 A1 Aug. 16, 2001

Related U.S. Application Data

(63) Continuation of application No. 09/539,406, filed on Mar. 31, 2000, now Pat. No. 6,250,604, which is a continuation-in-part of application No. 09/032,871, filed on Mar. 2, 1998, now Pat. No. 6,068,018.

(51) Int. Cl.[7] .......................... F16K 41/04; F16K 43/00
(52) U.S. Cl. ............... 251/214; 29/527.2; 29/890.123; 29/890.131; 137/315.28; 137/315.3; 137/242; 251/327; 251/368; 277/527; 277/530; 277/539; 277/549; 277/550; 277/938; 427/287
(58) Field of Search ................... 29/527.4, 527.5, 29/890.12, 890.123, 890.124, 890.131; 123/188.3; 137/242, 315.01, 315.28, 315.3, 315.31, 315.32; 251/214, 326, 327, 328, 329, 368; 277/510, 520, 525, 527, 530, 539, 549, 550, 938; 427/287

(56) References Cited

U.S. PATENT DOCUMENTS

| | | | |
|---|---|---|---|
| 2,058,143 A | 10/1936 | Flanders | 277/527 |
| 2,745,777 A | 5/1956 | Clarke, Jr. | 123/188.3 |
| 3,062,556 A | 11/1962 | Fino et al. | 277/527 |
| 3,219,311 A | 11/1965 | Siver | 251/214 |
| 3,257,095 A | 6/1966 | Siver | 251/214 |
| 3,284,089 A | 11/1966 | Wrenshall | 251/214 |
| 3,557,824 A | 1/1971 | Krehbiel et al. | 251/368 |
| 3,679,169 A | 7/1972 | Bedo et al. | 251/214 |
| 3,857,410 A | 12/1974 | Bedo et al. | 251/214 |
| 4,114,851 A | 9/1978 | Shivak et al. | 251/214 |
| 4,116,451 A | 9/1978 | Nixon et al. | 277/938 |
| 4,270,762 A | 6/1981 | Johnston | 277/527 |
| 4,363,465 A | 12/1982 | Morrill | 251/214 |
| 4,379,557 A | 4/1983 | Saka | 251/214 |
| 4,394,023 A | 7/1983 | Hinojosa | 251/214 |
| 4,451,047 A | 5/1984 | Herd et al. | 251/214 |
| 4,570,942 A | 2/1986 | Dielh et al. | 251/214 |
| 4,585,210 A | 4/1986 | Adams | 251/214 |
| 4,754,950 A | 7/1988 | Tada et al. | 251/368 |
| 4,787,736 A | 11/1988 | Mori et al. | 251/368 |
| 4,867,116 A | 9/1989 | De Freitas Couta Rosa et al. | 123/188.3 |
| 4,878,677 A | 11/1989 | Larkins et al. | 277/527 |
| 4,892,320 A | 1/1990 | Tuckmantel | 251/214 |
| 5,078,175 A | 1/1992 | Martin et al. | 251/214 |
| 5,201,532 A | 4/1993 | Saleski et al. | 277/539 |
| 5,222,521 A | 6/1993 | Kiblberg | 251/368 |
| 5,370,364 A | 12/1994 | Kenmoku et al. | 251/368 |
| 5,377,955 A | 1/1995 | Baker | 251/368 |
| 5,441,024 A | 8/1995 | Wietig et al. | 123/188.3 |
| 5,456,008 A | 10/1995 | Hugon | 29/527.4 |
| 5,478,048 A | 12/1995 | Salesky et al. | 251/214 |
| 5,503,180 A | 4/1996 | Nimberger | 251/214 |
| 5,577,737 A | 11/1996 | Lacy | 277/530 |
| 5,633,094 A | 5/1997 | Takeshima et al. | 251/368 |
| 5,819,774 A | 10/1998 | Beardsley et al. | 251/368 |

*Primary Examiner*—George L. Walton
(74) *Attorney, Agent, or Firm*—Michael A. O'Neil

(57) ABSTRACT

A valve stem has a thickness of hardfaced material on its outer diameter in the area contacting the stem packing where the seal is formed which prevents corrosion, erosion and/or scratching of the valve stem, thereby preventing formation of leak paths. A valve packing comprises a vertically stacked array comprising alternating metal pressure rings and graphite seals.

10 Claims, 10 Drawing Sheets

VALVE STEM AND METHOD OF MANUFACTURE; IMPROVED STEM PACKING

CROSS-REFERENCE TO RELATED APPLICATION

This application is a continuation of application Ser. No. 09/539,406 filed Mar. 31, 2000 now U.S. Pat. No. 6,250,604, which is a continuation-in-part application under 37 C.F.R. §1.53 of application Ser. No. 09/032,871 filed Mar. 2, 1998, now U.S. Pat. No. 6,068,018.

TECHNICAL FIELD

The present invention relates generally to valves of the type used in the petrochemical, refining, and other industries, and more particularly to an improved valve stem which is resistant to chemical and mechanical deterioration, to a method of manufacturing the valve stem, and to an improved packing construction useful in conjunction with the valve stem.

BACKGROUND AND SUMMARY OF THE INVENTION

Perhaps the most common valves used in the petrochemical, refining, and other industries are gate valves. Major components of gate valves include a body, a valve stem, a sealing member, and seat rings which are engaged by the sealing member to close the valve. Because the valve stem must extend from inside the valve body to outside the body, a stem packing must be installed to effectively seal between the body and the valve stem, thereby containing the product inside the piping system of which the valve is a part. To achieve the necessary dynamic seal to both contain the product within the piping system and allow the valve stem to actuate up and down, the area of the valve stem which makes contact with the stem packing must be smooth, round and have no taper on the outside surface of the valve stem.

When the valve is new, the foregoing conditions are met and product inside the piping system is prevented from leaking to the outside. As the valve ages, chemical corrosion from the product, galvanic corrosion from the packing, and erosion and corrosion from atmospheric conditions all combine to reduce the smoothness of the valve stem that is necessary to maintain the seal. Also, roughness of the valve stem can occur as the valve stem is pulled through the stem packing during normal cycling due to abrasive materials accumulating between the valve stem and the seal. Any of these factors, and particularly combinations thereof, can result in leak paths being created and leakage to occur. This is unsatisfactory for numerous reasons, the most important of which involves increasing enforcement of the federal Clean Air Act which makes prevention of leakage or "fugitive emissions" essential.

Previous attempts at solving the foregoing problems have included the application of the material sold under the trademark "HASTALLOY"®. Such material is partially effective in slowing valve stem deterioration due to chemical attack but is ineffective as to mechanical degradation of the valve stem surface.

While the prior art discloses a variety of valves, no prior disclosure shows a device where leakage is prevented by way of an overlay on the valve stem in the area of the stem packing. The improved valve stem of the present invention departs from the design of prior valve stems, and in doing so, provides a valve which prevents leakage and fugitive emissions as the valve ages.

SUMMARY OF THE INVENTION

The present invention provides an improved valve in which the valve stem has an overlay of hardfaced material that reduces the deterioration of the stem packing sealing surface. The hardfaced overlay is constructed of materials which resist corrosion, erosion, and scratching, thus eliminating the cause of most defects in the sealing surface of the valve stem. This in turn allows maintaining the original packing area finish, thereby preventing the creation of leak paths through the stem packing and fugitive emissions from the valve.

In accordance with more specific aspects of the invention, the portion of the valve stem that engages the sealing material has a nominal outside diameter which is first reduced, either during manufacture or modification of the valve stem. Hardfaced material is applied to the reduced diameter portion of the valve stem until the diameter thereof is increased beyond the nominal size. The diameter of the hardfaced material is next reduced to the nominal size, thus providing a valve stem that is smooth, hard, and resistant to chemical and mechanical deterioration.

The invention further comprises an improved valve packing useful in conjunction with the valve stem. The improved valve packing comprises alternating metal pressure rings and graphite seals. The improved packing enhances the performance of the improved valve stem by preventing leak paths through the packing which would otherwise result in fugitive emissions.

BRIEF DESCRIPTION OF DRAWINGS

A more complete understanding of the invention may be had by reference to the following Detailed Description when taken in conjunction with the accompanying Drawings, in which.

DETAILED DESCRIPTION

Figure 1:
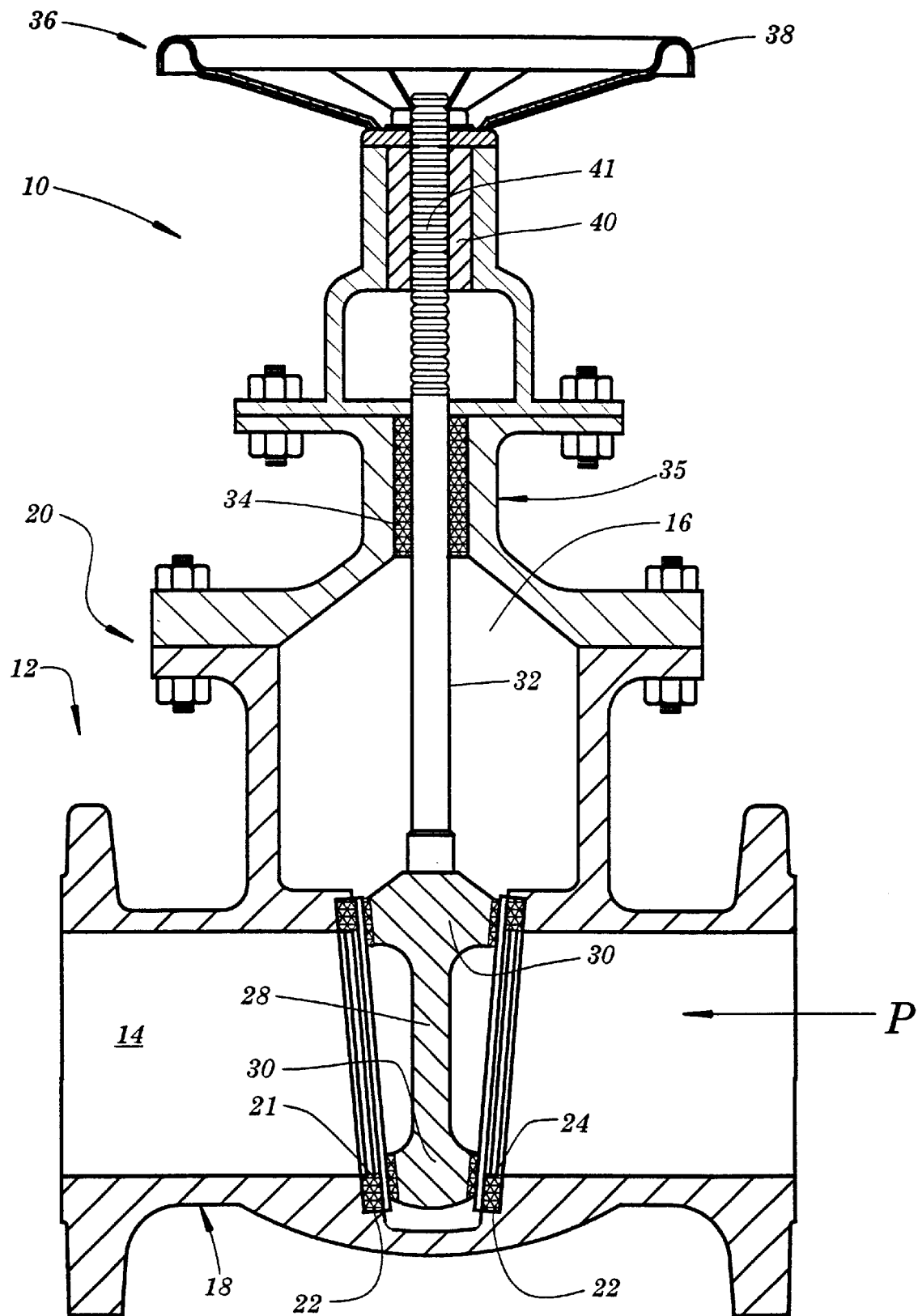
FIG. 1 is a sectional view of a gate valve having a valve stem constructed in accordance with the invention.

Referring now to the Drawings, and in particular to FIG. 1 thereof, there is shown an improved valve 10 having a body 12 constructed to provide a fluid path 14 and a body cavity 16. The fluid path 14 is generally located in the lower end 18 of body 12, while the cavity 16 extends from the upper end 20 of body 12 to the location of the fluid path 14. Disposed within the fluid path 14 are seat ring recesses 22 and seat rings 24 mounted in the seat ring recesses 22.

A valve member 28 is slidably positioned in the body 12 for movement through the cavity 16 such that sealing portions 30 of the valve member 28 may engage the seats 24. The valve member 28 is operably connected to a valve stem 32 which extends through a stem packing 34 located between the cavity 16 and a bonnet 35 mounted on the body 12.

The valve member 28 is actuated between the open and closed positions by an actuating member 36. The improved valve 10 is in the open position when the valve member does not engage the seats 24, and is in the closed position when the sealing portions 30 of the valve member 28 engage the seats 24 thereby completely restricting the flow of product P within the fluid path 14. The valve member 28 can be any member used to restrict or close flow through the improved valve 10, but in the preferred embodiment the valve member 28 is a wedge.

As shown in FIG. 1, the actuating member 36 may comprise a handwheel 38 secured to a threaded portion 41 of the valve stem 32. The threaded portion 41 is threadingly engaged with a nut 40 which is secured against rotation. As the handwheel 38 is turned clockwise, the nut 40 and the threaded portion 41 cause the valve member 28 to move downward until the valve 10 is in the closed condition. If the handwheel 38 is rotated counterclockwise, the nut 40 and the threaded portion 41 effect opening the valve 10. Although not shown, other actuating members well known in the art are also within the scope of this invention.

As the valve member 28 is moved during the opening and closing of the valve 10, the valve stem 32 slidingly engages the stem packing 34. The stem packing 34 is installed such that when the valve stem 32 slidingly engages the stem packing 34, a dynamic seal is effectively formed between the body 12, the bonnet 35, and the valve stem 32. The seal contains the product P found within the piping system of which the valve 10 is a part.

As the valve stem 32 moves up and down through stem packing 34, problems arise in the prior art because as the valve stem 32 ages, chemical corrosion from the product, galvanic corrosion from the stem packing 34, and both corrosion and erosion from the atmosphere cause a normal valve stem to lose the smoothness necessary to prevent damage to the stem packing 34, which causes a leak path to form. Also, abrasive materials accumulating between the packing and the stem can cause scratching of the surface of the valve stem, also causing leak paths. In severe cases, chemical and mechanical deterioration occur in combination.

Figure 2:
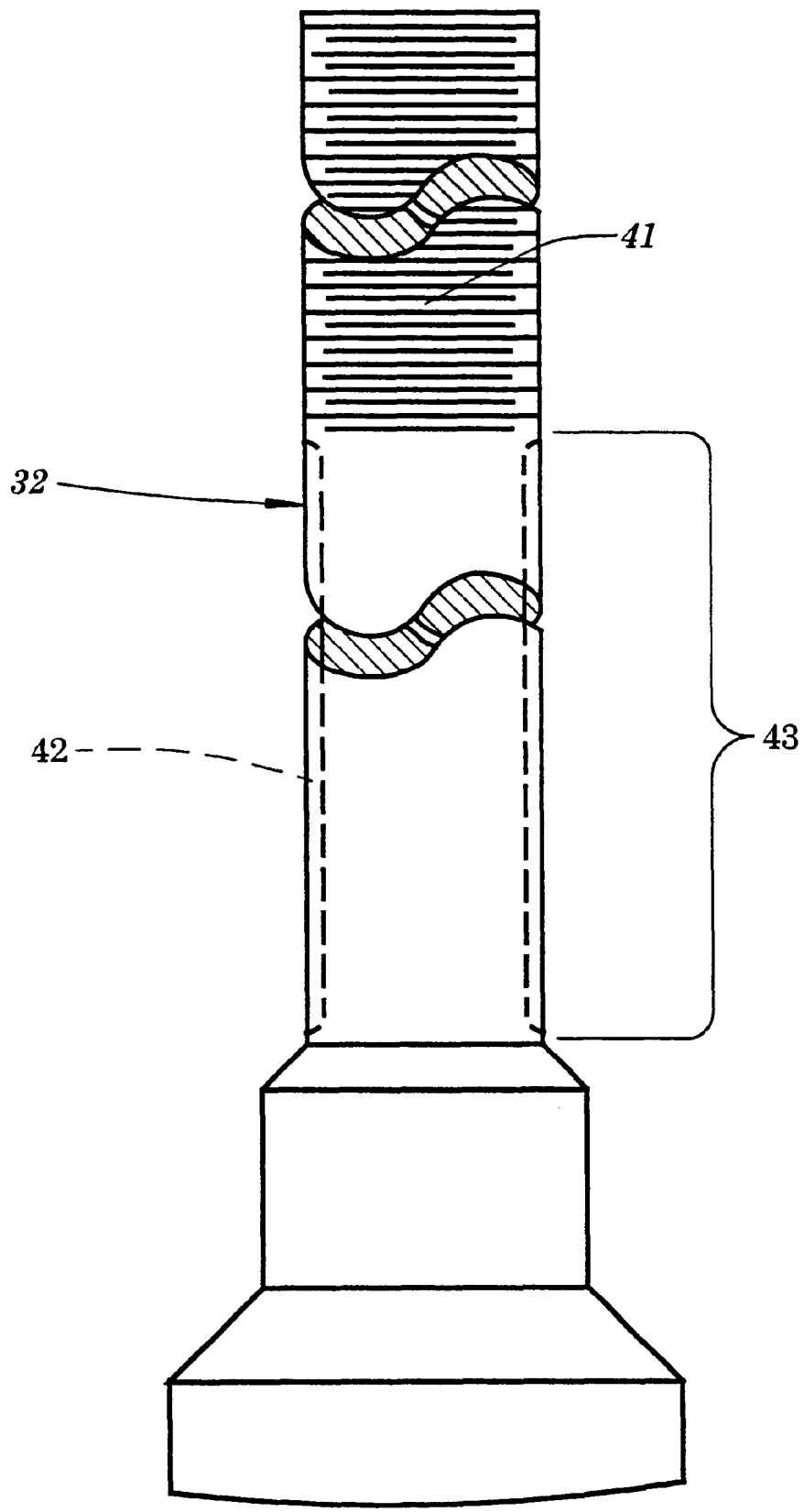
FIG. 2 is a side view of the improved valve stem of the invention.
Figure 3:
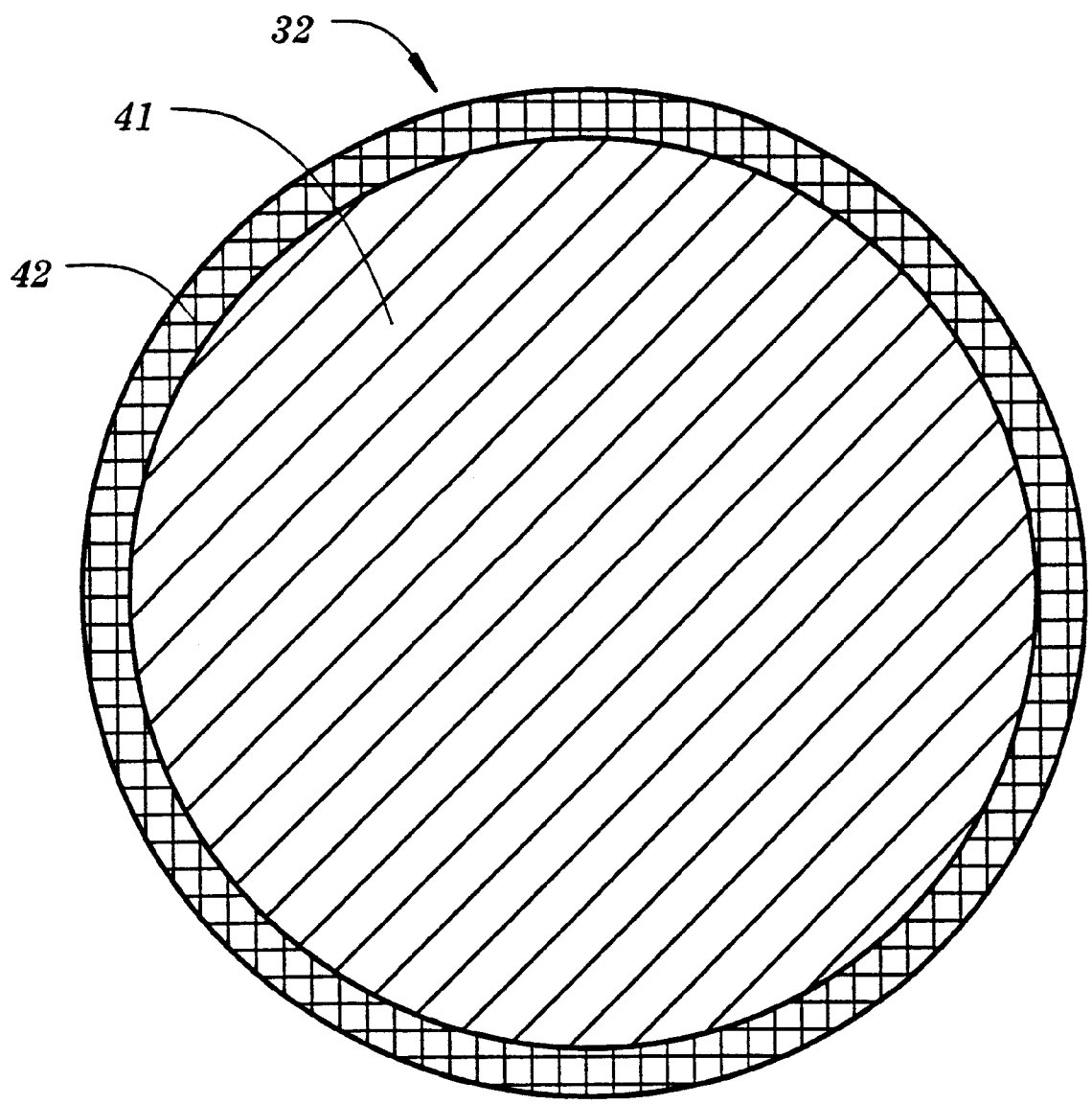
FIG. 3 is a cross-sectional view of the valve stem of FIG. 2.

As shown in FIG. 2, this problem is remedied by a thickness of hardfaced material 42 on the section 43 of the outside diameter of the valve member 28 which slidably engages the stem packing 34. The hardfaced material is a material resistant to corrosion, erosion, and scratching and includes materials with Brinell hardness numbers ranging from 220 to 380, such as Stoody® 6 manufactured by Stoody Company, 5557 Nashville Road, Bowling Green, Ky. 42101-7546, and Stellite® 6 and Stellite® 21 manufactured by Deloro Stellite, Inc., 471 Dundas St. E. Belleville, Ontario, Canada K8N 1G2. Materials with Brinell hardness numbers approximately 220 and below lack the required hardness to resist corrosion, erosion or scratching, while materials with Brinell hardness approximately 380 and above create problems in the machining process because they are very hard to machine and cause maintenance problems for the machining equipment. In the preferred embodiment, the hardfaced material 42 comprises either Stellite® 6 or Stellite® 21 with a Brinell number range of 320–380.

For an existing valve stem, the hardfaced material 42 is placed on the valve stem 32 by the following process. First, the outside diameter of an existing valve stem is machined down approximately 0.120 inches using a conventional machine tool. Next, the outside diameter of the valve stem 32 is built back up using a gas metal arc welding (GMAW) process to produce a section of hardfaced material 42 having an approximate total thickness of 0.200 to 0.250 inches. The now oversized valve stem 32 is machined back to its original diameter and may be polished required by particular applications of the invention. In the preferred embodiment using Stellite® 21, the finished valve stem 32 has a section of hardfaced material 42 having a thickness of approximately 0.090 inches. Other embodiments will call for a larger or smaller thickness ranging from 0.010 to 0.125 inches of hardfaced material 42. The exact thickness required for a particular application will depend upon the requirements of particular applications of the invention and/or by the corroded and scratched condition of the valve stem sought to be fitted with the thickness of hardfaced material.

The hardfaced material may also be applied using the plasma transfer arc (PTA) process. In the PTA process one or more powders, which may include metals and/or metallic salts and/or non-metallic materials, are directed into a plasma which melts the powdered material prior to transfer to the surface being treated. The use of the PTA process to apply the hardfaced material is beneficial in that the composition of the hardfaced material can be matched to the requirements of particular applications of the invention.

A new valve stem with a thickness of hardfaced material 42 and having a known diameter can be produced by the following method. First, a base material, such as stainless steel in the preferred embodiment, is forged or molded into a base stem having a diameter smaller than the nominal diameter, at least in the region that engages the packing. The molding process can be done by any method known in the art for forging, casting and/or molding metal. The diameter of the base stem will usually range between 0.010 to 0.125 inches smaller than the nominal diameter. In the preferred embodiment using Stellite® 6 or Stellite® 21, the diameter of the base stem will be 0.090 inches smaller than the known diameter. The diameter of the base stem can be varied according to the requirements of particular applications of the invention.

Once the base stem has been molded, hardfaced material 42, such as that previously disclosed, is welded onto the base stem until the diameter is greater than the nominal diameter. This can be done by the use of a gas metal arc welding (GMAW) process, providing an approximate total thickness of 0.125 to 0.250 inches of hardfaced material 42. The now oversized valve stem is machined back to its nominal diameter and polished. As in the preferred embodiment using Stellite® 6 or Stellite® 21, the finished valve stem has a thickness of hardfaced material of approximately 0.090 inches. Other embodiments will call for a larger or smaller thickness ranging from about 0.010 inches to about 0.125 inches of hardfaced material. The exact thickness required for a particular application will be dictated by the requirements of particular applications of the invention.

The hardfaced material may also be applied using the plasma transfer arc (PTA) process. In the PTA process one or more powders, which may include metals and/or metallic salts and/or non-metallic materials, are directed into a plasma which melts the powdered material prior to transfer to the surface being treated. The use of the PTA process to apply the hardfaced material is beneficial in that the composition of the hardfaced material can be matched to the requirements of particular applications of the invention.

Figure 4:
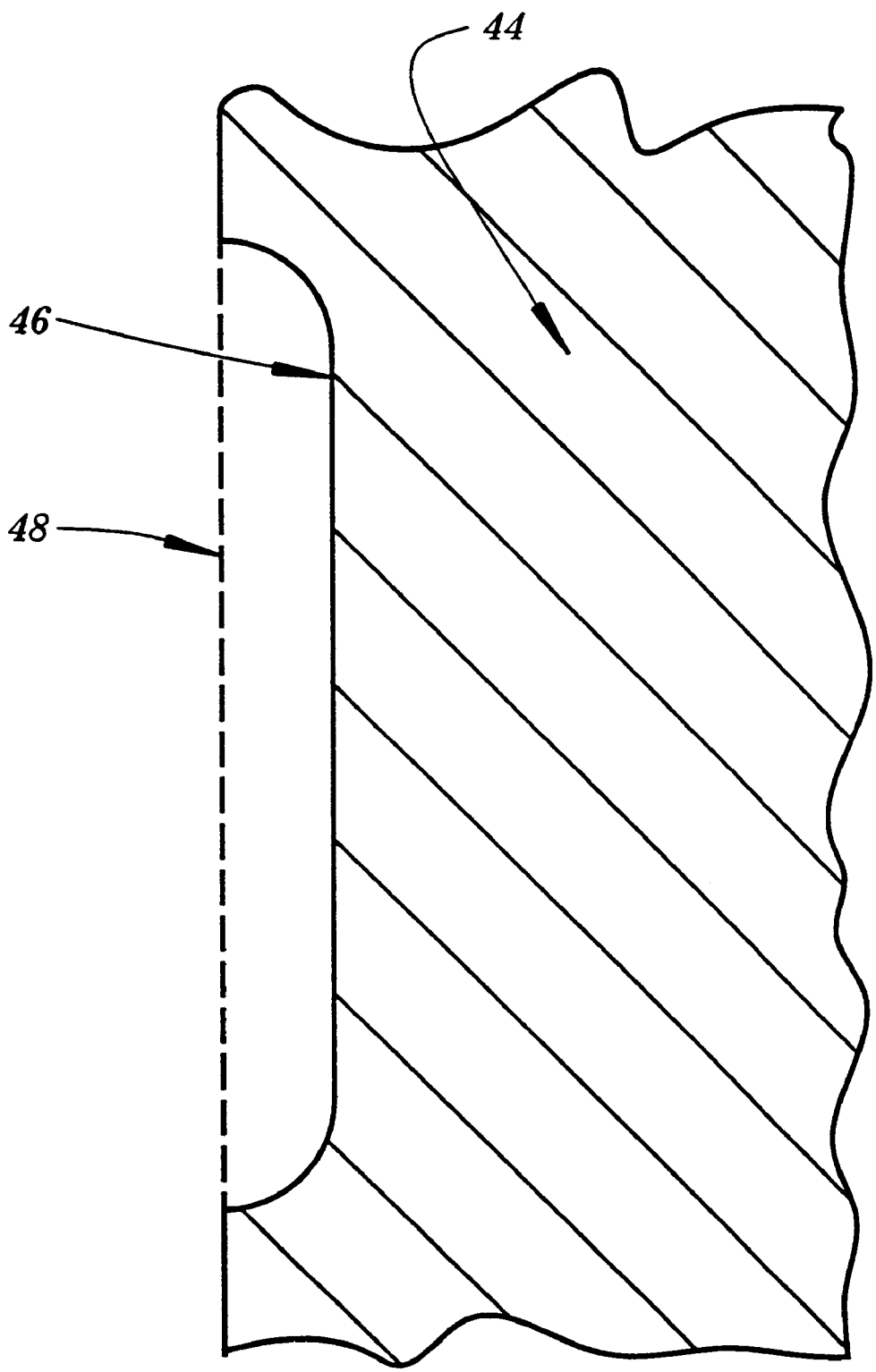
FIG. 4 is an illustration of a first step in the method of the invention.
Figure 5:
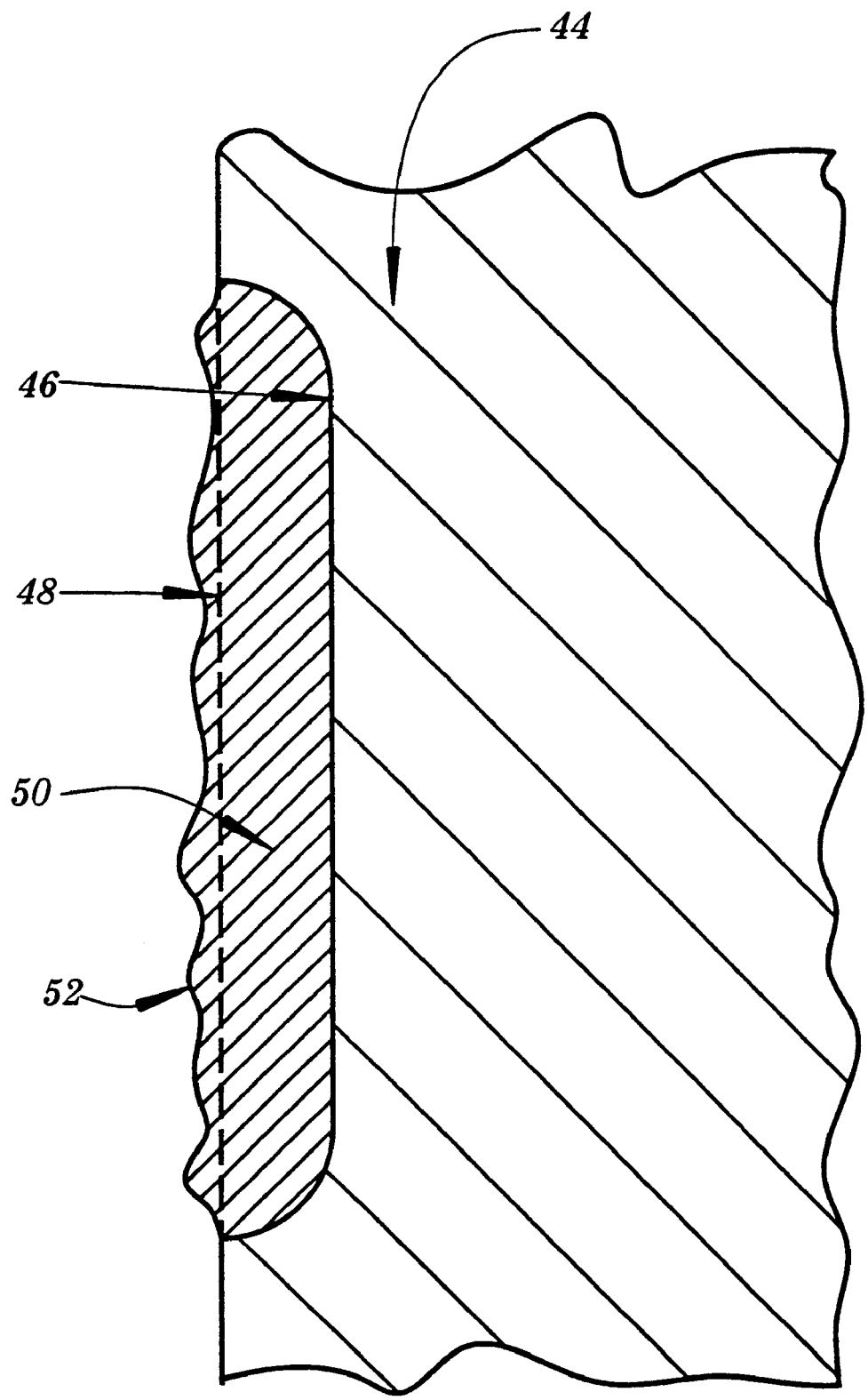
FIG. 5 is an illustration of a later step in the method of the invention.
Figure 6:
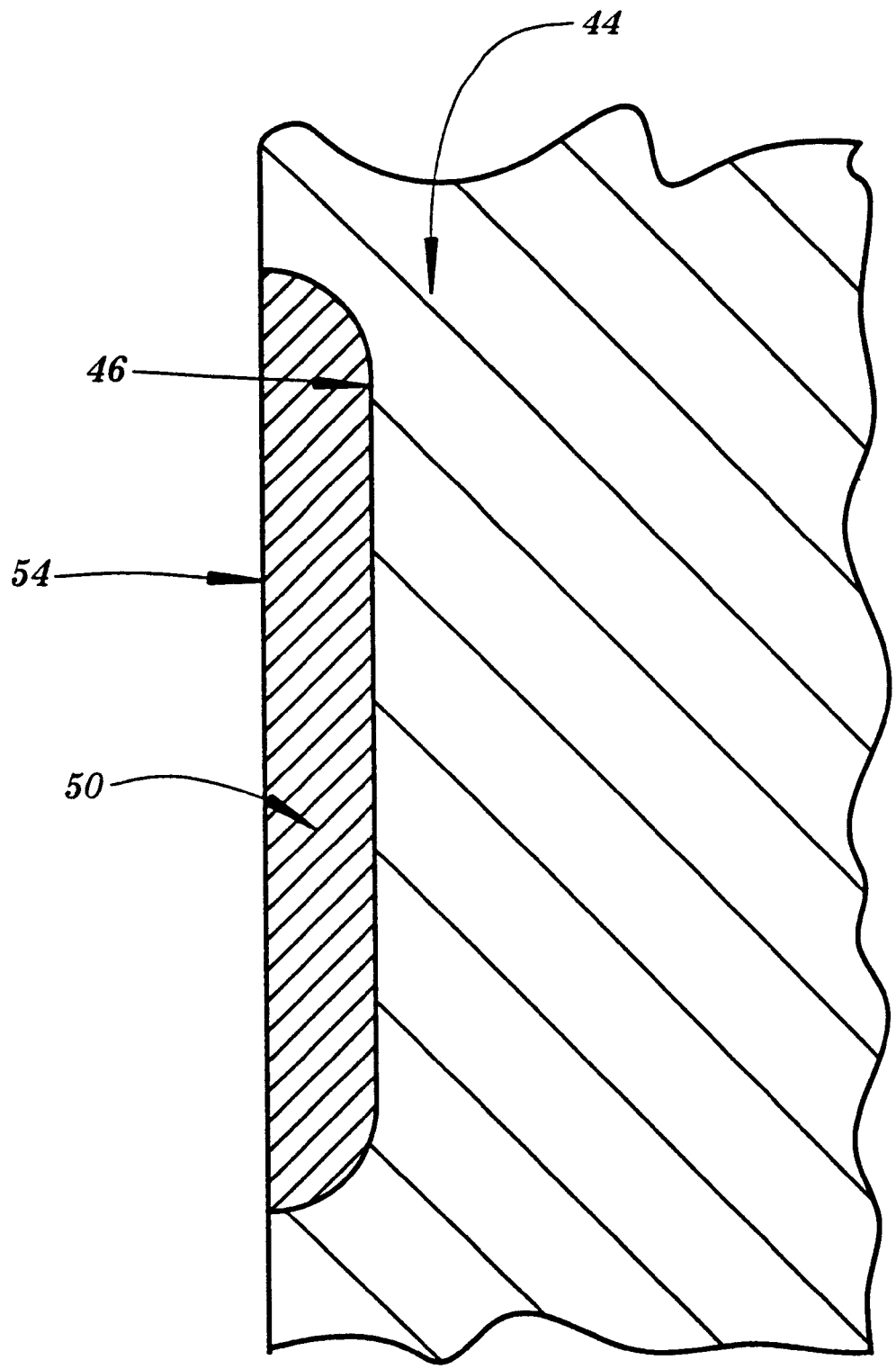
FIG. 6 is an illustration of a still later step in the method of the invention.

Referring to FIGS. 4, 5, and 6, the method of the present invention is illustrated. A valve stem 44 is provided with a portion 46 having a reduced diameter relative to the nominal diameter 48 of the valve stem. The reduced diameter portion comprises the area of the valve stem 44 which engages the seal of the valve. The reduced diameter portion 46 may be provided either in the original manufacture of the valve stem 44, or by grinding or otherwise machining a preexisting valve stem to provide the reduced diameter portion 46.

The reduced diameter portion 46 is filled with a layer of hardfaced material 50 which is applied to and secured to the valve stem 44 by welding. The welding of the hardfaced material 50 continues until the outer surface 52 thereof extends beyond the nominal diameter 48 of the valve stem 44. Thereafter, the hardfaced material is ground and polished to provide an exterior surface 54 thereof which is coincident with the nominal diameter 48 of the valve stem 44.

Figure 14:
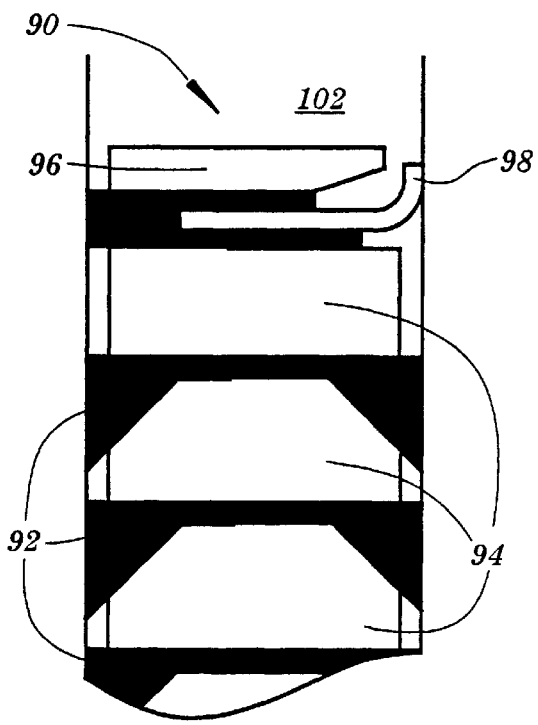
FIG. 14 is a view similar to FIG. 6 illustrating an embodiment of the invention wherein the hardfaced material is somewhat larger in diameter as compared with the diameter of the valve stem.
Figure 14:
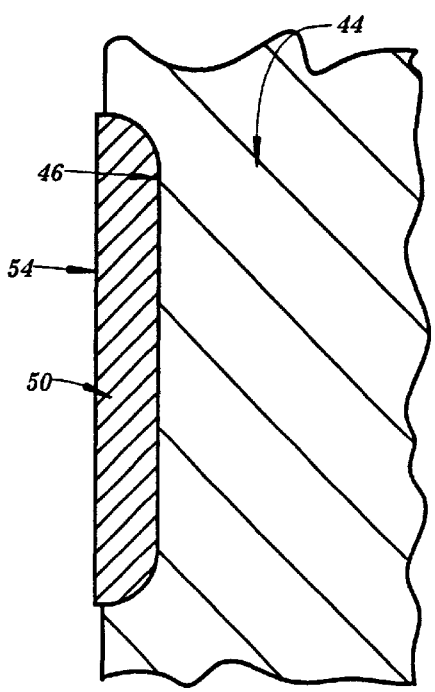

As is shown in FIG. 14, the hardfaced material 50 may have an outside diameter which is somewhat larger than the outside diameter of the valve stem 44, it being understood that the extent to which the outside diameter of the hardfaced material 50 exceeds the outside diameter of the valve stem 44 is exaggerated in FIG. 14 for clarity. In actual practice the extent to which the outside diameter of the hardfaced material exceeds the outside diameter of the valve stem does not exceed about 0.010 inches, it being understood that the diameters of the hardfaced material and of the valve stem can be varied in accordance with the requirements of particular applications of the invention. The embodiment of the invention illustrated in FIG. 14 is applicable both to remanufactured valve stems and to newly manufactured valve stems.

Figure 7:
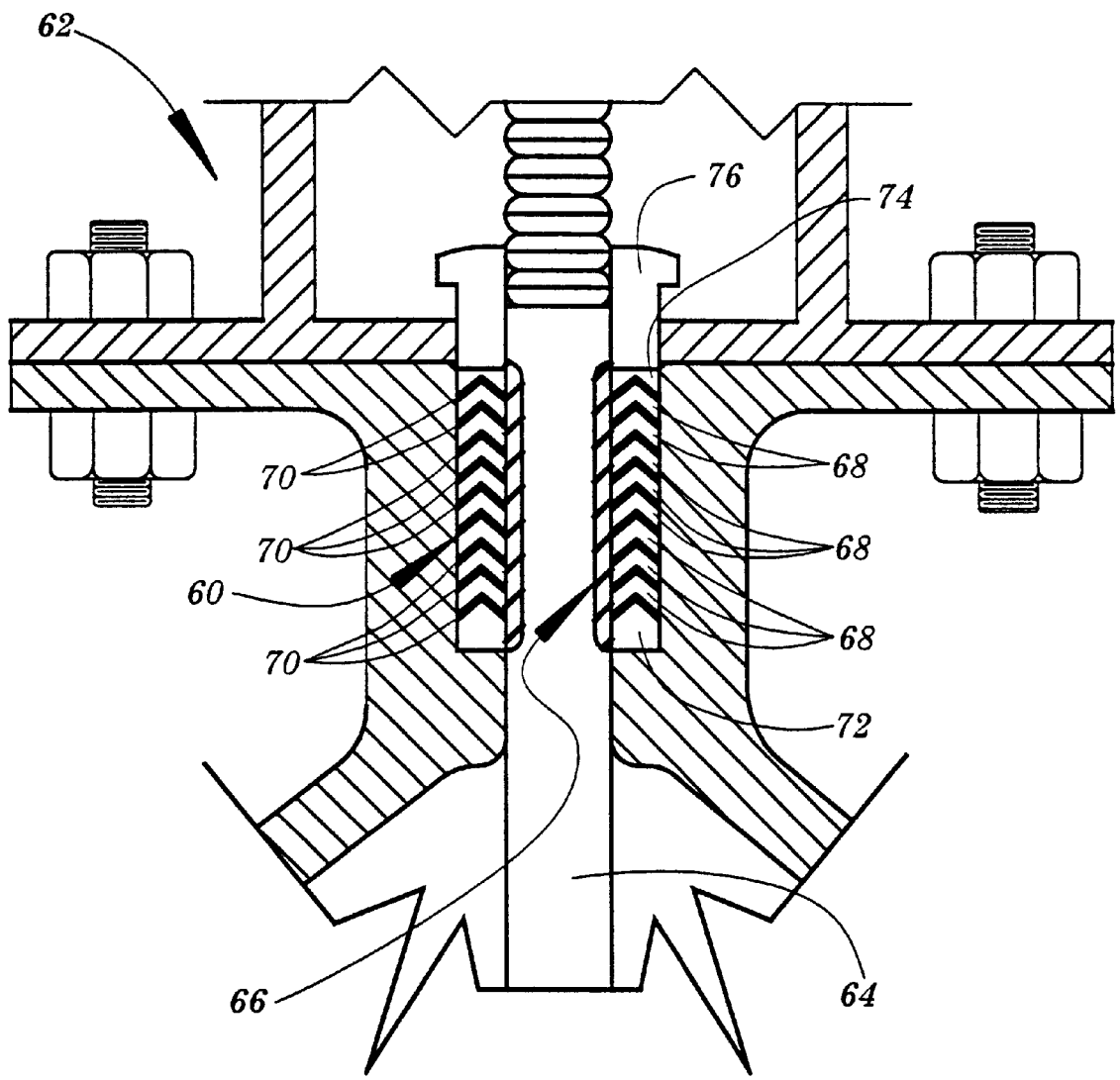
FIG. 7 is a sectional view of an improved valve packing useful in conjunction with the improved valve stem illustrated in FIGS. 1–6, inclusive.

Referring now to FIG. 7, there is shown an improved packing construction 60 useful in conjunction with the improved valve illustrated in FIGS. 1–6, inclusive, and described hereinabove in conjunction therewith. A valve assembly 62 includes a valve stem 64 which is provided with a section of hardfaced material 66 which is constructed as described hereinabove in conjunction with FIGS. 1–6, inclusive. The improved valve packing 60 is aligned with the section of hardfaced material 66.

The improved valve packing 60 comprises a vertically stacked array of metal pressure rings 68. Between each of the metal pressure rings 68 there is positioned a graphite seal 70. Both the metal pressure rings 68 and the graphite seals 70 have an inverted-V or chevron shape in cross section. Other cross-sectional configurations of the metal pressure rings 68 and the graphite seals 70 can be used in the practice of the invention, if desired.

Beneath the lower most graphite seal 70 there is provided a female adapter 72. Above the uppermost graphite seal 70 there is a provided a male adapter 74. A follower 76 is positioned above the male adapter 74.

As will be appreciated by those skilled in the art, the female adapter 72, the male adapter 74, and the follower 76 comprise components which are well known in the valve industry. In a typical application, the male adapter 74, the follower 76, an associated gland, and eye-bolts are employed to impose downward pressure on the packing which surrounds a valve stem. The object is to close any leak paths which might otherwise exist through the packing, thereby preventing fugitive emissions.

As is also well known, rubber impregnated fabrics, rubber coated fabrics, plastic impregnated fabrics, plastic coated fabrics, rubber and rubber-like compositions, plastic compositions, graphite, and other materials have heretofore been utilized as valve stem packings. Typically, such materials are arranged in layers, with each layer comprising an inverted V-shaped or chevron configuration.

In the use of prior art packing constructions, the compressive force imposed by the eye-bolts, the gland, the follower, and the male adapter have resulted in significant compression of the uppermost layers of the packing. However, the lower layers comprising the packing have remained uncompressed. This results in leak paths through the lower portion of the packing, which in turn leads to fugitive emissions from the valve.

In direct contrast to the unsatisfactory functioning of prior art packing constructions, in the use of the packing of the present invention the application of compressive force by the actuation of eye-bolts or other threaded members, the associated gland, the follower, and the male adapter initially causes compression of the uppermost graphite seal 70. The material comprising the uppermost graphite seal 70 is thereby forced outwardly from the space between the male adapter and the uppermost metal pressure ring 68. Inward and outward flow of the material comprising the uppermost graphite seal 70 continues until the male adapter engages the uppermost metal pressure ring 68. Thereafter the process repeats itself except that the outward flow comprises the material of the next succeeding graphite seal 70. Again, outward flow of the material comprising the next succeeding graphite seal 70 continues until the uppermost metal pressure ring 68 engages the next succeeding metal pressure ring 68. Thereafter the process continues except that the outward flow comprises the material of the succeeding graphite seal 70, etc.

In this manner the material comprising each and every one of the graphite seals 70 is caused to flow inwardly and outwardly, thereby entirely filling the spaces between the packing and the valve stem, and between the packing and the valve body. In this manner, any possibility of a leak path through the packing is completely eliminated, the end result being complete elimination of the problem of fugitive emissions from valves incorporating the present invention.

Figure 9:
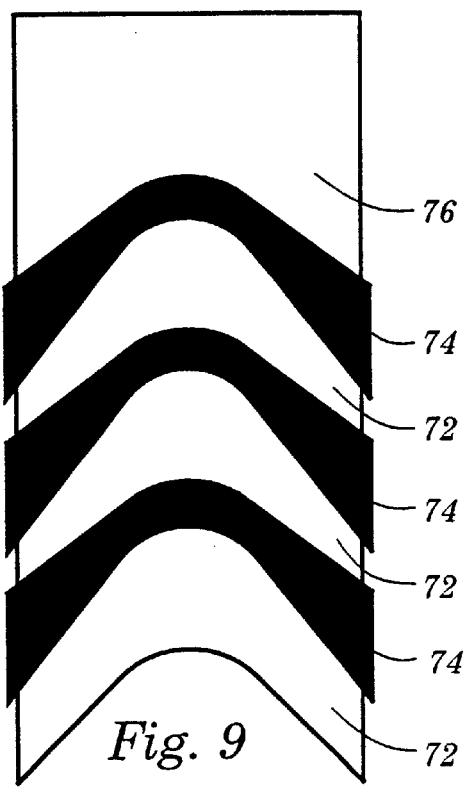
FIG. 9 is an illustration of a packing similar to that of FIG. 7 but having a different cross section.
Figure 10:
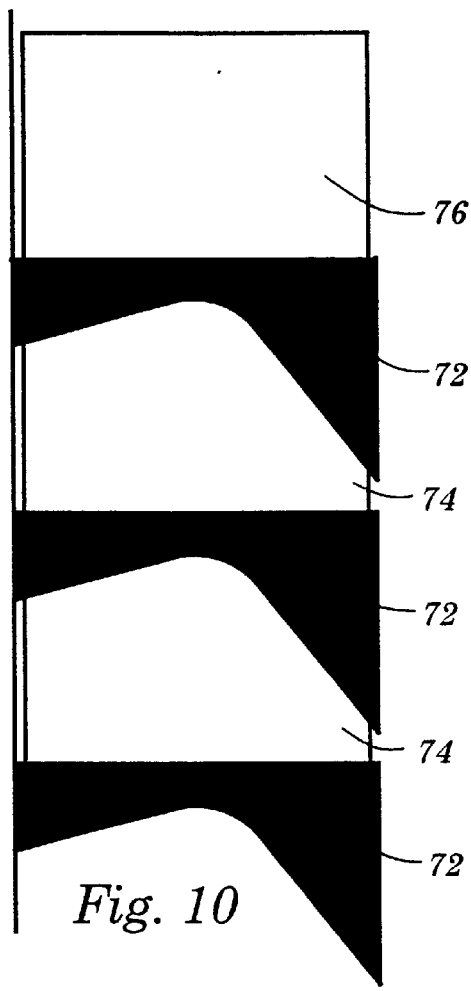
FIG. 10 is an illustration of a packing similar to that of FIG. 7 but having a different cross section.
Figure 11:
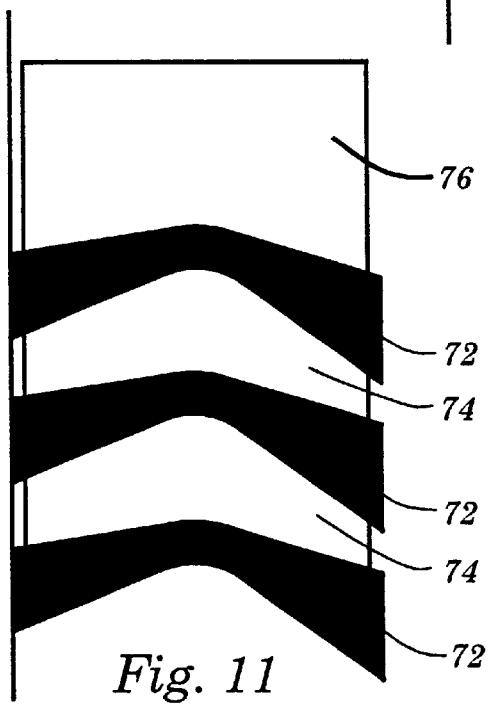
FIG. 11 is an illustration of a packing similar to that of FIG. 7 but having a different cross section.

FIGS. 9, 10, and 11 illustrate alternative cross-sectional configurations of the metal pressure rings and the graphite seals of the improved packing of the present invention.

Figure 8:
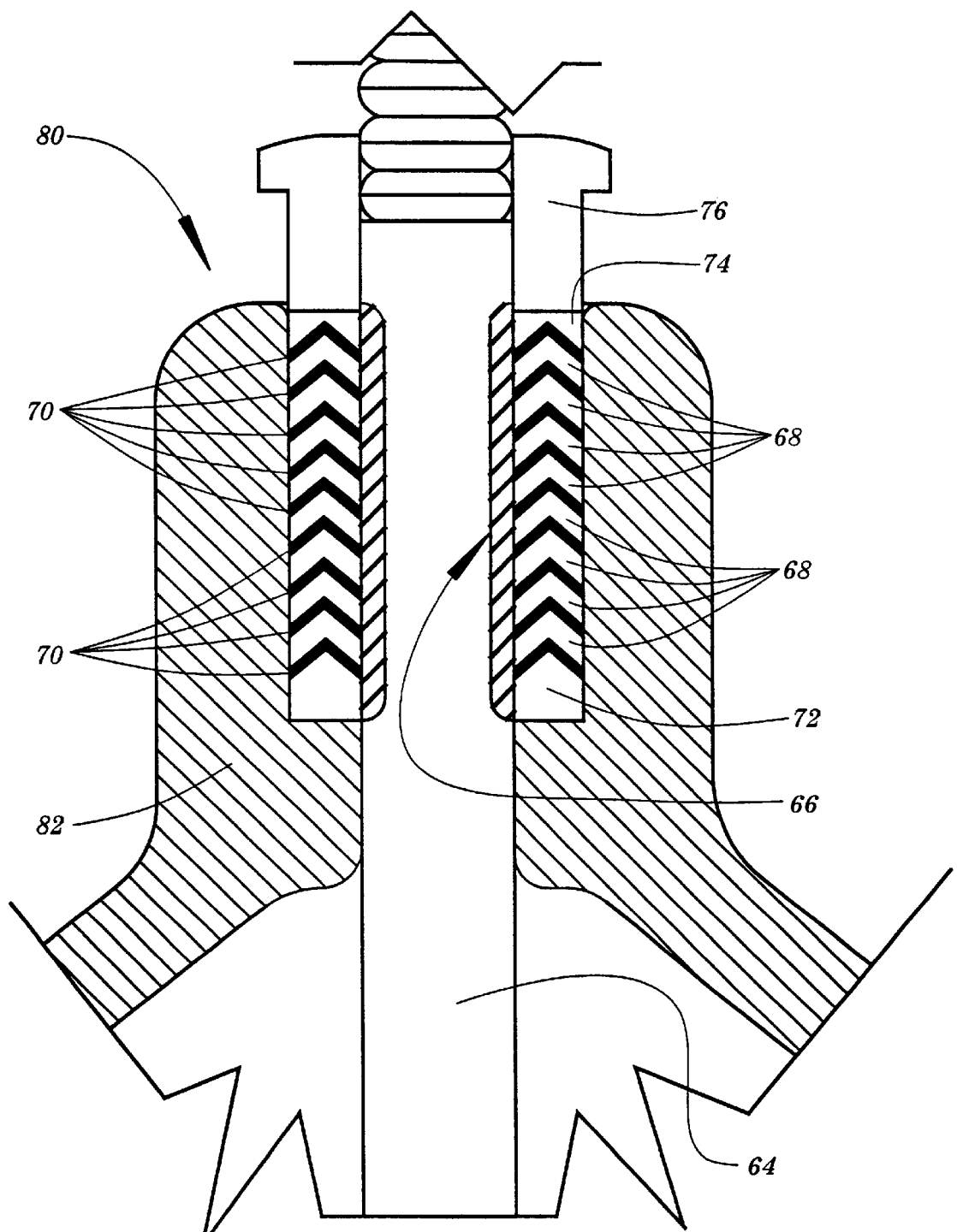
FIG. 8 is an illustration similar to FIG. 7 showing a different application of the improved valve stem packing.

It will be appreciated that the component parts of the apparatus illustrated in FIG. 7 other than the improved valve packing 60 are identical to the component parts of the apparatus illustrated in FIG. 1. In FIG. 8 there is shown an apparatus 80 comprising numerous component parts which are identical to component parts of the apparatus shown in FIG. 7. Such identical component parts are identified in FIG. 8 with the same reference numerals utilized hereinabove in the description of the apparatus of FIG. 7.

The apparatus 80 includes a bonnet 82. The follower 76 of the improved valve packing 60 extends above the upper end of the bonnet 82. Otherwise, the apparatus of FIG. 8 is identical to the apparatus of FIG. 7 in construction and operation.

Figure 13:
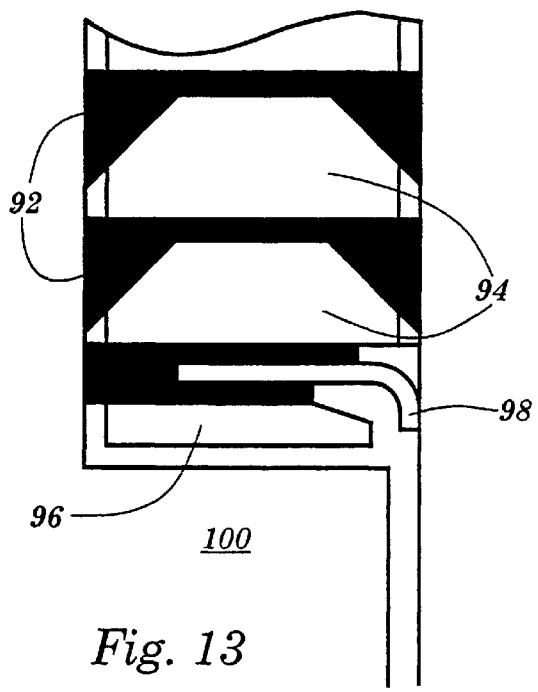
FIG. 13 is an enlargement of a portion of FIG. 12.
Figure 12:
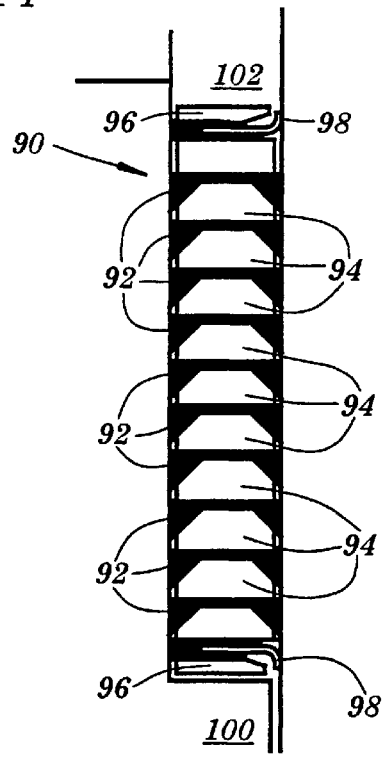
FIG. 12 is an illustration of a packing similar to FIG. 7 but having a different cross section and having scrapers at the opposite ends thereof.

FIGS. 12 and 13 illustrate an improved packing construction 90 which differs somewhat from the packing construction 60 illustrated in FIGS. 7–11, inclusive, and described hereinabove in conjunction therewith. The packing 90 includes graphite seals 92 and pressure rings 94. The packing 90 further includes thrust plates 96 located at the opposite ends thereof and scrapers 98. The packing 90 is mounted in a bonnet 100 and is engaged by a follower 102 at the upper end thereof.

In use, the packing 90 functions similarly to the functioning of the packing 60 as described hereinabove. The scrapers 98 prevent debris, that may accumulate on the valve stem either above or below the packing 90, from becoming lodged in the graphite seals 92 which, if allowed to occur, could lead to deterioration either of the graphite seals or of the valve stem which in turn could lead to leak paths through the packing 90. As will be appreciated by those skilled in the art, the cross-sectional configurations of the pressure rings and graphite seals illustrated in FIGS. 8, 9, 10, and 11 may be utilized in the packing member 90 depending upon the requirements of particular applications of the invention. Likewise, the cross-sectional configuration of the graphite seals and the pressure ring of the packing 90 as illustrated in FIGS. 12 and 13 may be utilized in the packing 60, if desired.

Although preferred embodiments of the invention are illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. In a valve of the type including:
    a. a body constructed to have
        (i) a fluid path;
        (ii) a stem bore connected in fluid communication with the fluid path; and
        (iii) a seat;
    b. a stem packing located in the stem bore;
    c. a valve member having a valve stem and a sealing member, the valve member being positionable in the stem bore so that the sealing member may engage the seat, the valve stem engaging the stem packing in the stem bore; and
    d. an actuating member connected to the valve stem for actuating the valve member; the improvement comprising:
    the valve stem having a uniform diameter throughout its length and including a section of welded hardfaced material aligned with the stem packing, having a thickness of between about 0.010 inches and about 0.125 inches thereby preventing damage to the hardfaced material under the action of foreign materials in the stem packing, and having a Brinell hardness number of between about 220 and about 380 in contact with said stem packing so that upon relative movement between the valve stem and the stem packing the welded hardfaced material section of the valve stem resists corrosion, erosion, and scratching due to foreign materials in the stem packing over a prolonged period of time; and
    an improved stem packing located in the stem bore in engagement with the hardfaced material and comprising at least one metal pressure ring and at least one sealing member.

2. The improvement according to claim 1 wherein the sealing member of the improved stem packing comprising a graphite seal.

3. The improvement according to claim 2 further characterized by a plurality of metal pressure rings arranged in a vertically stacked array and a plurality of graphite seals, each of the graphite seals being positioned between two of the metal pressure rings comprising the array.

4. The improvement according to claim 3 wherein each of the metal pressure rings and each of the graphite seals is chevron shaped in cross section.

5. The improvement according to claim 3 wherein each of the metal pressure rings and each of the graphite seals have the cross-sectional configuration illustrated in FIG. 9.

6. The improvement according to claim 3 wherein each of the metal pressure rings and each of the graphite seals have the cross-sectional configuration illustrated in FIG. 10.

7. The improvement according to claim 3 wherein each of the metal pressure rings and each of the graphite seals have the cross-sectional configuration illustrated in FIG. 11.

8. The improvement according to claim 3 wherein each of the metal pressure rings and each of the graphite seals have the cross-sectional configuration illustrated in FIG. 12.

9. The improvement according to claim 3 further characterized by scrapers located at the opposite ends of the stacked array for engagement with the valve stem to prevent debris from entering the packing member.

10. The improvement according to claim 9 further including thrust plates positioned on the opposite sides of the packing members.

* * * * *